United States Patent [19]

Reist et al.

[11] 3,719,267

[45] March 6, 1973

[54] APPARATUS FOR ADJUSTING THE SPEED OF A TRANSPORT BAND EQUIPPED WITH GRIPPERS TO THE SPEED OF A CONVEYOR BAND ARRANGED AHEAD OF SUCH TRANSPORT BAND

[75] Inventors: Walter Reist, Hinwil; Heinz Meili, Wadenswil, both of Switzerland

[73] Assignee: Ferag, Fehr & Reist AG, Zurich, Switzerland

[22] Filed: April 20, 1971

[21] Appl. No.: 135,690

[30] Foreign Application Priority Data

April 29, 1970 Switzerland..........................6443/70

[52] U.S. Cl. ..........................198/76, 271/50, 271/79
[51] Int. Cl. ..........................B65g 37/00, B65h 9/14
[58] Field of Search..............198/37, 39, 102, 76, 21; 271/69, 79, 82, 50

[56] References Cited

UNITED STATES PATENTS 3,075,630  1/1963  Fisk........................................198/76
3,388,905  6/1968  Nash et al...........................271/69 X Primary Examiner—Evon C. Blunk
Assistant Examiner—Hadd S. Lane
Attorney—Craig, Antonelli & Hill

[57] ABSTRACT

An apparatus for adjusting of accommodating the speed of a transport band equipped with grippers to the speed of a conveyor band arranged ahead of such transport band, wherein the conveyor band serves to convey a stream of individual articles, especially newspapers. According to the invention, there is contemplated the provision of two control or regulator means, of which the first serves to control the speed of transport band equipped with the grippers as a function of the average speed of the conveyed stream of individual articles, and the second control or regulator means serves to synchronize the movement of the aforesaid transport band with the movement of the individual articles, so that a respective gripper of the transport band seizes or engages with an individual article conveyed by the conveyor band.

5 Claims, 3 Drawing Figures

APPARATUS FOR ADJUSTING THE SPEED OF A TRANSPORT BAND EQUIPPED WITH GRIPPERS TO THE SPEED OF A CONVEYOR BAND ARRANGED AHEAD OF SUCH TRANSPORT BAND

BACKGROUND OF THE INVENTION

The present invention relates to a new and improved apparatus for accommodating or adjusting the speed of a transport band equipped with grippers to the speed of a conveyor band arranged ahead of such transport band, the conveyor band serving to convey a stream of individual objects or articles, especially newspapers.

Different physical constructions of apparatuses are already known which serve the purpose of accommodating or adjusting the speed of two successively arranged and operatively coordinated transport bands or belts to one another, and specifically wherein the speed of movement of the subsequently arranged transport band is accommodated to the speed of movement of the forwardly arranged transport band through the intermediary of a single control circuit. In those cases where the second transport band is equipped with gripper devices for engaging a respective individual article or object delivered by the first transport band, the heretofore known systems resorting to simple synchronized apparatus constructions possess the drawback that oftentimes one of the gripper elements is not always located at the correct moment of time at the transfer location of the article delivered by the first transport band. When this happens the transferred article is not properly engaged by one of the gripper elements of the second transport band, resulting in an operational disturbance or fault at the entire conveying or article transport installation.

The individual objects or articles may be typically, for instance, newspapers which are transferred from a first processing machine to another processing machine with the aid of the aforementioned two successively arranged conveyor or transport bands. The irregularities in the conveying of the newspapers is predicated upon the fact that the momentary stream of newspapers departing from the first processing machine and arriving at the first conveyor or transport band is completely independent of the instantaneous position of the gripper elements of the second transport or conveyor band. Similar problems arise during start-up of the entire installation, wherein furthermore the spacing between the individual successively deposited or situated newspapers is not always the same.

In consideration of the foregoing various operational conditions which can arise in systems of this type it should be quite apparent that reliable cooperation and coordination of two successively arranged transport or conveyor bands or the like of a conveying installation, wherein the second conveyor band is equipped with grippers, cannot be merely achieved by providing a simple mechanical coupling of the drives of both transport bands, nor through the provision of a control device which ensures for the uniformity of the average speed of both transport bands. Movement of the second transport band and thus also the momentary position of its individual grippers cannot be controlled either by the first or by the second device in such a manner that a respective gripper will be properly located at the right time at the transition location between both transport bands in order to engage the momentarily transferred newspaper and to convey such further.

SUMMARY OF THE INVENTION

Thus, up to the present there is still required means for accommodating the velocity of a transport band or the like equipped with gripper elements for articles to the velocity of a conveyor band arranged ahead of this transport band, which is not associated with the aforementioned drawbacks of the prior art systems. Hence, a primary object of the present invention is to provide apparatus which effectively and reliably fulfills the existing need in the art and overcomes the aforementioned drawbacks of the prior art system.

Still another and more specific object of the present invention relates to an apparatus for properly coordinating the movement of a transport band equipped with grippers to the movement of the forwardly arranged conveyor band such that at the transfer location of an article from the forwardly arranged conveyor band to the transport band a gripper element thereof will be located at the right time in a position to receive the transferred article and to convey such further.

In keeping with the above objectives, it is still a further aim of this invention to provide a control system for successively arranged transport or conveyor devices wherein there is ensured absolute coordination between the speed of movements of both transport devices such that mechanism for seizing a transferred article will be located at the right time in the correct position for seizing such transferred article.

Now, in order to implement these and still further objects of the invention, which will become more readily apparent as the description proceeds, and for the purpose of considerably overcoming all of the previously mentioned drawbacks existent with the prior art systems the invention contemplates an apparatus which is equipped with two control or regulating means, one such control means controlling the speed of movement of the transport band or the like equipped with the gripper elements in accordance with the average speed of the conveyed stream of individual articles, while the second control means synchronizes the movement of the transport band with the movement of the individual articles in such a way that a respective gripper element of the transport band engages with an individual article conveyed by the conveyor band.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
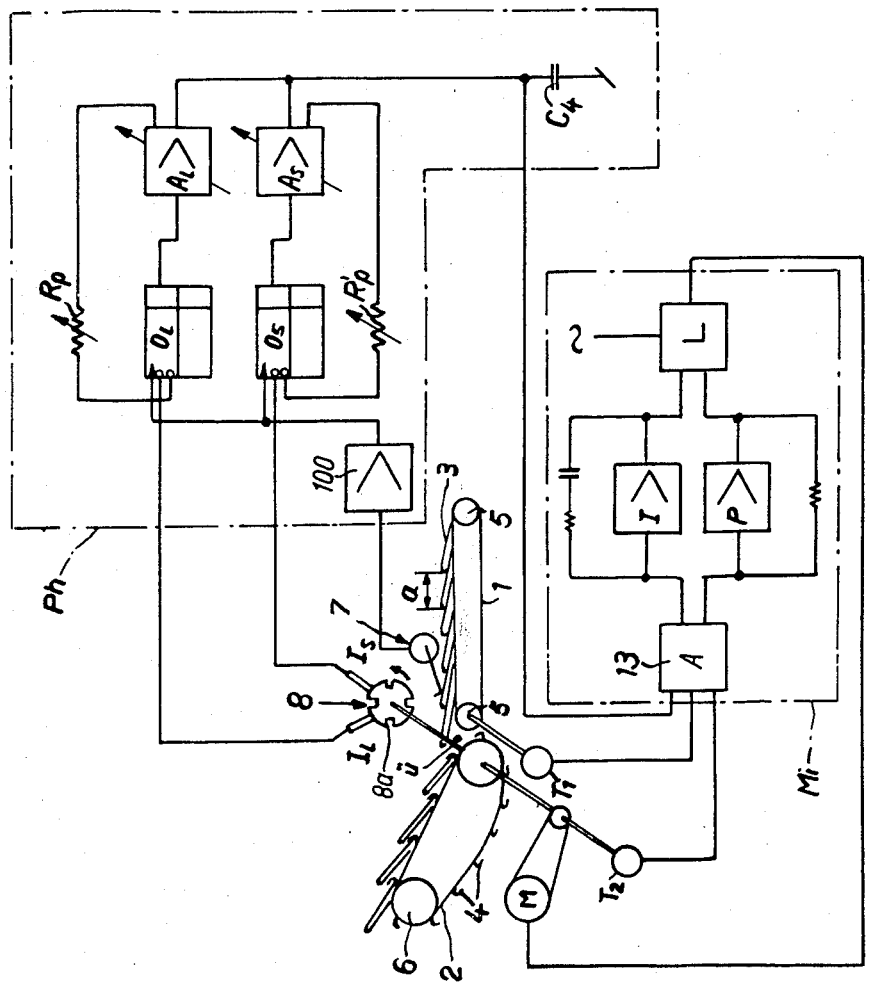
FIG. 1 is a schematic illustration of a complete apparatus for the transfer of articles and utilizing the principles of the present invention.

Describing now the drawings, as will be recognized by initially referring to FIG. 1 the entire installation will be seen to embody a conveyor device here shown in the form of a conveyor band or belt 1 and a transport device following this conveyor band 1, here shown in the form of a subsequently arranged transport band or belt 2. The conveyor band 1 receives or removes a stream of individual articles or objects, for instance newspapers, from a non-illustrated processing machine. The newspapers 3 arriving at the conveyor band 1 are delivered at the transfer location $u$ to the transport band 2 equipped with appropriate article gripper elements 4 arranged about the circumference of the transport band 2, as shown. This transport band 2 then receives the newspapers 3 from the conveyor band 1 and conveys such to a further, likewise non-illustrated processing machine. The details of the processing machines are not necessary to an understanding of the invention, therefore, to preserve clarity in illustration have been conveniently omitted from the drawings.

Continuing, it would be observed that the conveyor band 1 is carried by a group of deflecting rollers 5, at least one of these rollers 5 being driven by any suitable and therefore non-illustrated drive motor. The transport band 2 is supported in slip-free manner by a different group of deflecting rollers 6, and here also at least one of these rollers 6 is suitably driven by an appropriate drive.

The speed of movement of the conveyor band 1 is accommodated to the number of newspapers which arrive thereon per unit of time. This speed of movement, however, is also calculated such that the newspapers which are deposited in succession upon conveyor band 1 form a stream of papers arranged in a fish grate-like manner, in other words wherein each newspaper at least partially overlaps the adjacent newspaper. Further, the speed of movement of the conveyor band 1 is also calculated such that the spacing $a$ of the rear edge or spine of two neighboring successive newspapers 3 is maintained as constant as possible from one another. The speed of movement of the transport band 2 arranged after the conveyor band 1 must be calculated such that a respective gripper element or gripper means 4 is in a preparatory position at the transfer location $u$ when a newspaper arrives at such transfer location.

Now the required accommodation or matching of the movements of both bands or belts 1 and 2 is obtained with the aid of the electric circuitry which will be described hereinafter.

Basically, two control or regulating means are employed, and specifically an average value regulator $Mi$ and a phase regulator $Ph$ (FIG. 1). Both of these regulators $Mi$ and $Ph$ effectuate accommodation of the speed of movement of the transport band 2 to the movement of the newspapers which are intended to be delivered thereto and which newspapers are still located upon the conveyor band 1.

The phase regulator $Ph$ receives a control magnitude firstly from a feeler or scanner 7 which scans the position of individual newspapers conveyed by the conveyor band 1, and secondly from a slotted disc 8 which is scanned by two feelers $I_l$ and $I_r$. The slotted disc 8 is rigidly connected for rotation with one of the deflecting rollers 6 and possesses the same number of slots or openings about its periphery as the number of gripper elements 4 pass the transition or transfer location $u$ during one complete revolution of the aforementioned roller 6.

Feeler elements $I_l$ and $I_r$ can be designed as electrical contacts actuated by the slotted disc 8, and which in discrete successive time periods and in accordance with the rotation of the slotted disc 8 electrically couple one pole or terminal of a voltage source to the inputs of the phase regulator $Ph$. This operation appears in the form of voltage pulses at the evaluation circuits of the phase regulator $Ph$, and only the front flank of the momentary pulse is evaluated.

There is also provided the further feeler member or scanning element 7 which here is designed in the form of a lever, one end of which glides over the spine of the newspapers 3 and the opposite end of which actuates a further electrical contact. Once again there is produced a voltage pulse as a function of the momentary position of each newspaper spine. Here also with this voltage pulse only the front or forward flank thereof is evaluated, as will be more fully explained hereinafter.

Continuing, as will be observed by referring to the drawings the output of the phase regulator $Ph$ is electrically coupled with one of the inputs of the average value regulator $Mi$. A second input of the average value regulator $Mi$ is electrically coupled with a first tacho-generator $T_1$ and the third input is coupled with a second tacho-generator $T_2$. The first tacho-generator $T_1$ is driven by one of the rollers 5 of the conveyor band 1 and the other tacho-generator $T_2$ from one of the rollers 6 of the transport band 2. All three of these input signals are processed in this average value regulator $Mi$ in such a manner that an output signal is generated which controls the power supply to the drive motor $M$ driving the transport band or belt 2. Controlling the power supply to the drive motor $M$ results in the operation that a respective one of the grippers or gripper elements 4 moves past the transfer location $u$ in order to engage and further convey a newspaper delivered by the conveyor band 1 and arriving at this transfer location $u$.

Phase regulator $Ph$ essentially possesses two paths along which the input signals can be processed. At the input side of each such path there is connected a respective pulse shaper $O_l$ and $O_s$, the respective outputs of which are connected via an associated current generator $A_l$ and $A_s$, respectively to a common capacitor $C_4$. A portion of the output of each current generator $A_l$ and $A_s$ is fed back in each instance via the feedback resistors $R_p$ and $R'_p$ to the input side of the respective pulse shapers $O_l$ and $O_s$. Phase regulator $Ph$ additionally embodies an amplifier 100 which amplifies the pulses delivered by the feeler element 7. The output of amplifier 100 forms a third input for the pulse shapers $O_l$ and $O_s$ as shown.

The average value regulator $Mi$ will be described in detail in the following description of this invention. It is for that reason FIG. 1 only depicts a block circuit diagram of this portion of the circuitry and which will serve to assist in explaining the mode of operation of conveying or transport gripper or clamp. This operational concept is basically achieved in that two control or regulating systems are employed, one of which responds to the average velocity of the stream of newspapers conveyed by the conveyor band 1 — the average value regulator — and the other of which responds to the position of the individual newspapers within the newspaper stream — namely the phase regulator —. Both of these systems can either conjointly act upon a drive motor M or separately or conjointly act upon a plurality of drive motors, for instance if there is employed a booster drive arrangement. If would also be possible to use a power Selsyn drive motor arrangement.

Now at the average value regulator Mi the average speed or velocity of the stream of newspapers together with the average velocity or speed of movement of the entrainment means 4 must be evaluated. Both velokities or both corresponding rotational speeds are either measured in analogue or digital fashion and evaluated in an analogue or digital control. The average value regulator should possess a proportional and inegral behavior By means of the phase regulator there should be determined the local position of the newspaper in the stream of papers which is to be transferred and this position then compared with the relevant entrainment means or gripper of the transport band 2, so that a respective newspaper is brought together with a respective gripper element 4 within the entire average value control range at a defined transfer location and with a certain permissible tolerance or deviation (± 20 percent of the newspaper spacing).

The position of the newspaper as well as the gripper or entrainment means 4 is determined in digital fashion the position of the newspaper by means of the feeler 7, and the position of the gripper element 4 by means of the slotted disc 8 and the two feeler elements $I_l$ and $I_s$. The feeler 7 is able to determine the presence of the spine of the newspaper and thus delivers an electrical signal, the forward flank of which is digitally evaluated. A slot in the disc 8, which slots have been indicated by reference character 8a in FIG. 1, corresponds to a gripper or entrainment element 4 and its share in the sphere or range of the determinable phase errors.

As previously explained the slotted disc 8 must possess as many slots 8a as grippers or entrainment elements 4 move past a fixed transfer location $u$ during each complete rotation or revolution of the slotted disc. The provision of only a single slot 8a at the slotted disc 8 would provide the greatest solution and the disc would then only make one complete revolution between two grippers or entrainment elements 4.

Now the feeler $I_s$ which is initially passed by a slot 8a of the slotted disc 8 which is moving in the direction of the arrow V indicated thereat prepares a correction for more revolutions, the other feeler $I_l$ for less revolutions. If the flank of the newspaper scanner or feeler 7 appears during such time as a slot of the slotted disc 8 passes a feeler, then a correction pulse of defined duration or length, for instance of about 20 ms is released for minimum phase error within an entire average value regulator-range; for the feeler $I_s$ for more revolutions and for the feeler $I_l$ for less revolutions. In the case of increasing phase errors the correction pulse length is increased proportionally in that the integrated correction pulse is fed back corresponding to the pulse transmitter. Depending upon the sign of the phase error, the correction pulses appropriately switch a positive or negative current generator $A_l$ or $A_s$ which linearly charges or discharges the capacitor $C_4$. There thus appears a polarized correction voltage which is now delivered to the average value regulator or to an auxiliary drive.

As soon as the minimum phase error occurs the slot of the slotted disc 8 driven by the motor M oscillates at least within the insensitive zone as a function of the time-constant of the entire control system. This insensitive zone is essentially defined by the spacing between both feelers $I_l$ and $I_s$.

As soon as the moment of intertia of the transport band 2 is greater than its moment, then there must be provided an additional braking system to ensure for a stable operation of the apparatus.

The current generators $A_l$ and $A_s$ and the correction signal feedback means $B_p$ and $R'_p$ are adjustable, so that the phase regulator can be optimumly accommodated to the transport band 2.

When the production operation is initiated, in other words when the system is placed into operation the average value regulator M$i$ is immediately effective together with the start of the newspaper manufacturing machine, while the phase regulator P$h$ is only then effective when the stream of newspapers 3 has reached the feeler 7. If there is provided a second forwardly arranged feeler then the phase regulator P$h$ will come into play sooner, the second feeler then fulfills the function of the first feeler until such has been reached by the stream of newspapers, whereupon this second feeler is then switched-out by the first feeler. The most advantageous or favorable position of both feelers can be determined quite easily by carrying out a number of trial runs.

If a number of feelers 7 are used, for instance $x$-feelers, which are distributed along the distance or spacing $a$ of the newspapers and if there is provided an appropriate mechanical "step-up" of the slotted disc, then phase errors can already be measured $x$-times within one newspaper spacing $a$, resulting in a more precise and exact phase regulation.

The phase-locked synchronization could be still further improved by measuring the acceleration and acceleration changes, and so forth.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for adjusting the speed of a transport device equipped with grippers to the speed of a conveyor device arranged ahead of such transport device, wherein the conveyor device serves to convey a stream of individual articles, especially newspapers, the combination of: two regulator means defining a first regulator means and a second regulator means, said first regulator means serving to control the speed of the transport device equipped with the grippers as a function of the average speed of the conveyed stream of individual articles, and said second regulator means serving to the average value regulator M$i$. Now at average value regulator M$i$ the received signals are amplified by the network 13 (block A) and are processed in such a manner for controlling the supply L of the drive motor M that a proportional control (block P) and at the same time an integral control (block I) of the drive motor M is attained.

Figure 2:
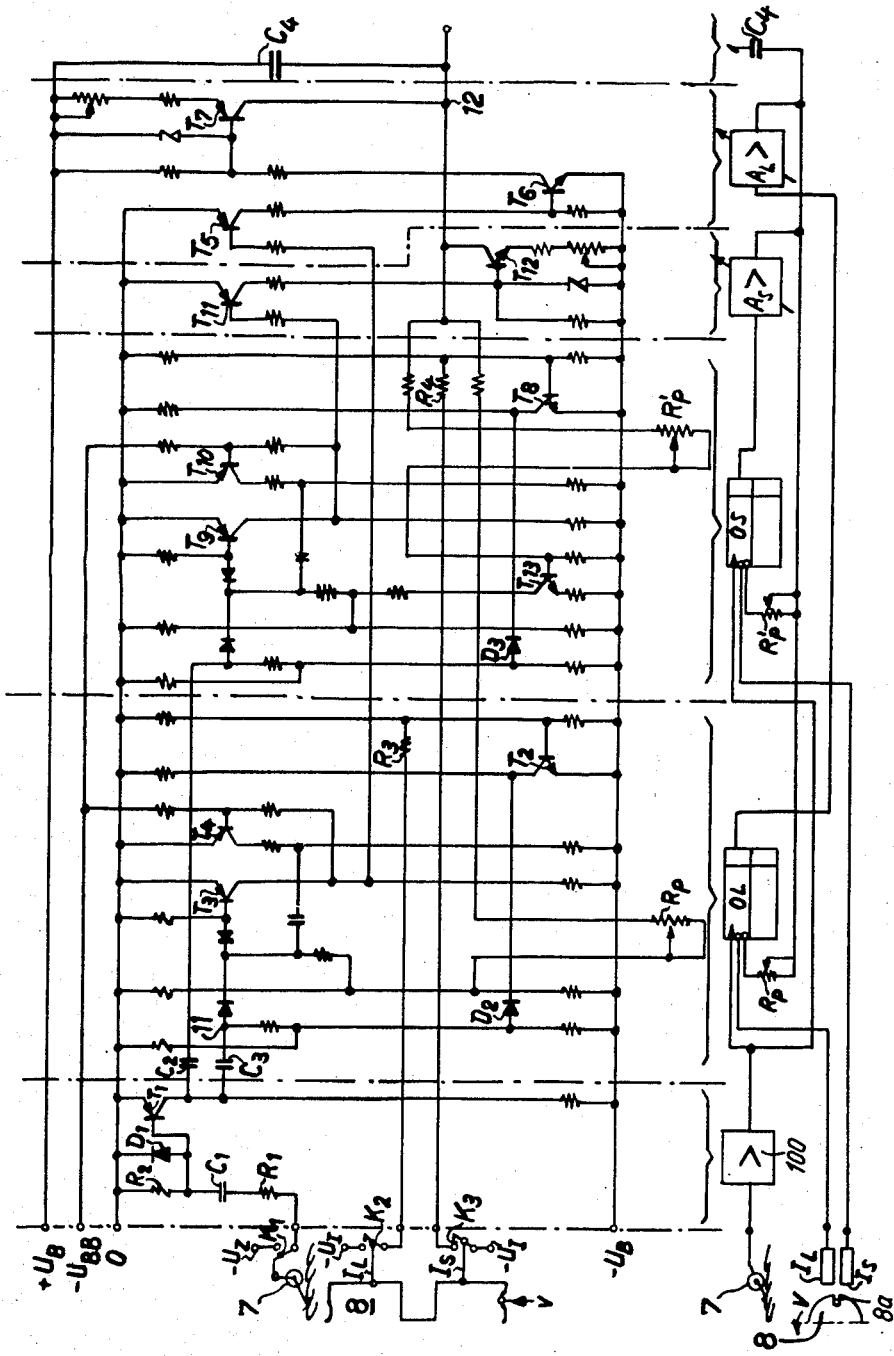
FIG. 2 is a circuit diagram of a control or regulator means of the apparatus system of FIG. 1.
Figure 3:
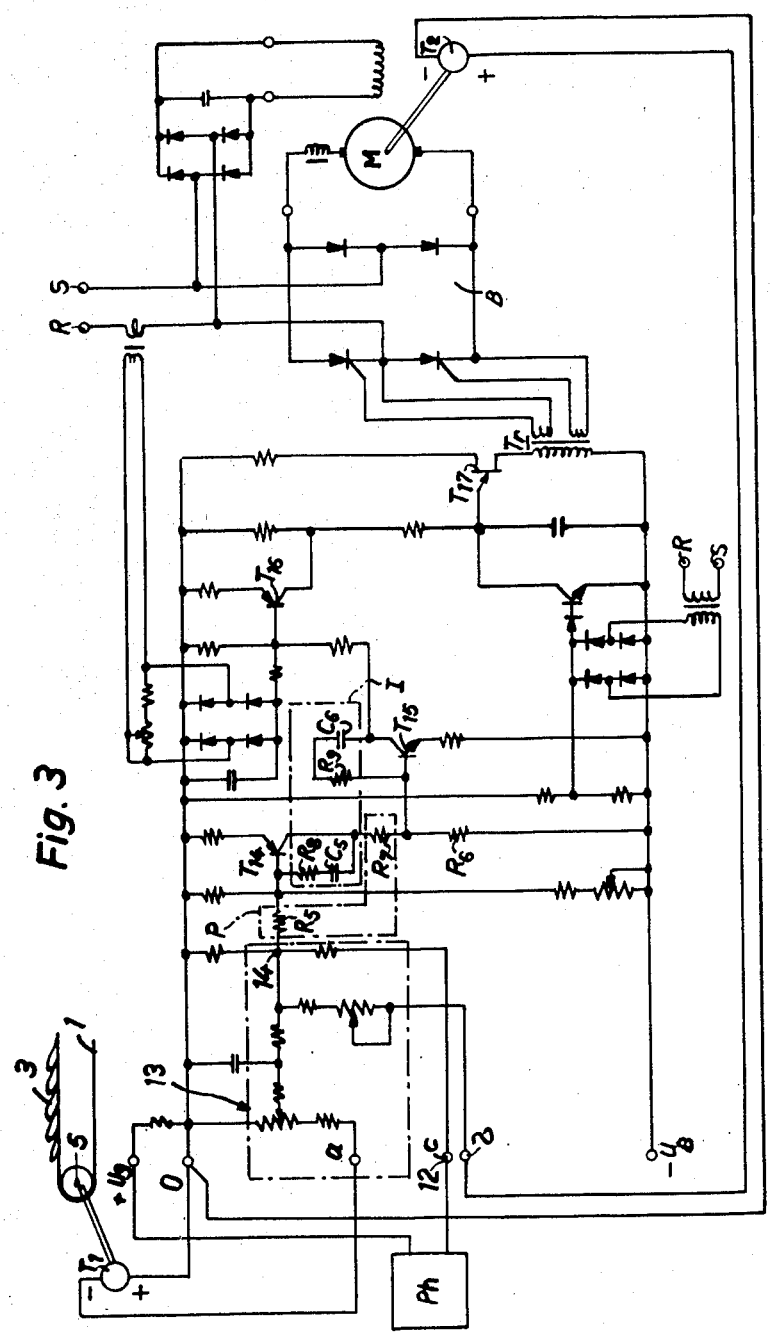
FIG. 3 is a circuit diagram for a different embodiment of control or regulator means of the apparatus system of FIG. 1.

The upper portion of FIG. 2 illustrates a detailed schematic circuit diagram of the phase regulator, while at the lower portion of this Figure there have been illustrated the corresponding blocks which appear in FIG. 1. It will be seen that the lever-like feeler or scanner 7 actuates an electrical contact $K_1$, by means of which a terminal $-U_z$ of the non-illustrated voltage supply source is electrically connected via a first resistor $R_1$ and a first capacitor $C_1$ to the base of the an isolating or interruption transistor $T_1$. The voltage pulse which appears as a result of switching the contact or switch $K_1$ is delivered through the agency of the first capacitor $C_1$ to the base of the transistor $T_1$. The diode $D_1$ connected forwardly of the transistor $T_1$ serves to protect the base-emitter path of transistor $T_1$ when reversing the polarity of the voltage at the capacitor $C_1$. The output formed at the collector of the transistor $T_1$, which at the same time represents the output of the amplifier 100 appearing at the lower portion of this FIG. 2, is branched via the coupling capacitors $C_2$ and $C_3$ to the pulse shapers $O_l$ and $O_s$ respectively, as shown.

The feelers $I_l$ and $I_s$ are likewise constructed as controlled contacts $K_2$ and $K_3$ respectively, which connect one terminal of the non-illustrated electrical voltage supply source for the installation to the inputs of the associated pulse shapers $O_l$ and $O_s$ respectively. The first scanner or feeler $I_l$, which brings about deceleration of the transport band 2, actuates the contact or switch $K_2$ which is mechanically coupled therewith. The negative voltage $-U_l$ is delivered through the agency of a further resistor $R_3$ and a further interruption or separation stage, consisting of the transistor $T_2$ and diode $D_2$, to a junction or terminal point which, as already described, likewise receives a portion of the signal from the feeler 7. These signals are now conjointly logically processed at the monostable flip-flop circuit embodying transistors $T_3$ and $T_4$. Such control the power transistor $T_7$ through the agency of transistors $T_5$ and $T_6$. At the output of the power transistor $T_7$, this output being referenced by numeral 12, there is connected a terminal of a further capacitor $C_4$ so that charging of the capacitor is controlled by the pulses delivered by the power transistor $t_7$. A feedback signal is likewise derived at this junction or point 12, and this feedback signal is delivered via the controllable or variable resistor $R_p$ to the input of the monostable flip-flop circuit containing the transistors $T_3$ and $T_4$ and thus controls the pulse duration of the monostable flip-flop circuit.

Now the other feeler $I_s$, which brings about the more rapid movement or acceleration of the transport band 2 in the event that the momentary gripper arrives at the transfer location $\mu$ later than the time of arrival of a newspaper, is likewise electrically coupled with the junction point 12 by means of a circuit configuration which is similar to that which has just been described. This second circuit essentially consists of a resistor $R_4$, which again is coupled through the agency of the separation stage consisting of a further transistor $T_8$ and a further diode $D_3$, with a second monostable flip-flop circuit possessing transistors $T_9$ and $T_{10}$ and, further, is connected via a control transistor $T_{11}$ to a further power transistor $T_{12}$ and therefore also to the junction point 12 of the phase regulator. A feedback signal for this circuit is likewise derived at junction point 12, and specifically through the agency of a further controllable or variable resistor $R'_p$ which is delivered through the agency of a further transistor $T_{13}$ to the second monostable flip-flop circuit incorporating transistors $T_9$ and $T_{10}$. An electrode of the capacitor $C_4$ is likewise electrically connected with the junction point 12 of the phase regulator P$h$, as best shown by referring further to FIG. 2. The capacitor $C_4$ is charged and discharged by the pulses delivered by the power transistors $T_7$ and $T_{12}$ respectively. The relative position of the pulses as a function of time and delivered by the feeler 7 and $I_{feelers\ s}$ or $I_l$ serve to control the previously discussed operations. The output signal of the phase regulator P$h$ obtained in this manner is then delivered to the average value regulator M$i$.

Now at the input of the average value regulator M$i$ there is connected an addition network 13. At this addition network 13 all three input signals, namely, the input signal from the phase regulator P$h$, the input signal from the first tacho-generator $T_1$ and the input signal from the second tacho-generator $T_2$ are added. These added signals are processed in a switching circuit embodying the transistor $T_{14}$ which switching circuit is responsible for the proportional-integral behavior of the entire control. The output terminal 14 of the addition network 13 is connected via a resistor $R_5$ with the base of the transistor $T_{14}$, and between its collector and its power resistor $R_6$ there is electrically coupled a further resistor $R_7$.

The resistors $R_5$ and $R_7$ connected into the circuit are responsible for the proportional behavior of the control. Connected parallel to the base-collector path of the transistor $T_{14}$ is a series circuit consisting of a resistor $R_8$ and a capacitor $C_5$. This series circuit $R_8$, $C_5$, together with a further similar constructed series circuit embodying resistor $R_9$ and capacitor $C_6$, are responsible for the integral behavior of the control. This further series circuit, which as just explained embodies the resistor $R_9$ and the capacitor $C_6$ is connected in parallel to the base-collector path of a transistor $T_{15}$ connected after the transistor $T_{14}$. The thus obtained control signal, after a required amplification by means of the transistor $T_{16}$, is then delivered to a uni-junction transistor $T_{17}$ which, through the agency of a transformer $T_r$ controls a controllable rectification bridge B serving to supply with power the drive motor M. The power output of this motor M, as previously already explained, is transmitted via one of the deflecting rollers 6 to the transport band 2. The second tacho-generator $T_2$ is rigidly connected for rotation with the shaft of the drive motor M, the output signal of tacho-generator $T_2$ being delivered as one of the input signals to the addition network 13 (block A).

The purpose of the described apparatus resides in ensuring that the object entrainment elements of the processing machine together with the newspapers will always arrive at the same transfer location within a certain tolerance time which is as small as possible, so that each newspaper has operatively associated therewith a synchronize the movement of said transport device with the movement of the individual articles so that a respective gripper of the transport device seizes an individual article conveyed by the conveyor device.

2. The apparatus as defined in claim 1, further including power supply means for said transport device, said first regulator means embodies an addition network having a first input, second input and third input, a first tacho-generator means driven by said conveyor device connected with said first input of said addition network, a second tacho-generator means driven by said transport device connected with said second input of said addition network, said addition network including an output connected via control means possessing both integral as well as proportional behavior with said power supply means of said transport device, drive means for said transport device, said power supply means having an output connected with said drive means of said transport device, said second regulator means incorporating feeler means for determining the presence of individual articles conveyed by the conveyor device and further incorporating a slotted disc and two feeler elements cooperating with said slotted disc, said feeler means and said feeler elements being connected via correction pulse shaper means as well as current generator means to said third input of said addition network of said first regulator means.

3. The apparatus as defined in claim 2, wherein the output of said current generator means is connected via feedback resistor means with the input of said correction pulse shaper means connected therewith.

4. The apparatus as defined in claim 1, wherein said second regulator means is responsive to the positioning of articles on the conveyor device and to the positioning of grippers on the transport device.

5. The apparatus as defined in claim 4, wherein the second regulator means provides an output to the first regulator means, and the first regulator means provides an output for controlling drive means of the transport device.

* * * * *